(12) United States Patent
Pan et al.

(10) Patent No.: US 12,085,809 B2
(45) Date of Patent: Sep. 10, 2024

(54) BACKLIGHT MODULE AND METHOD FOR MANUFACTURING SAME, AND DISPLAY DEVICE

(71) Applicants: Fuzhou BOE Optoelectronics Technology Co., Ltd., Fujian (CN); BOE Technology Group Co., Ltd., Beijing (CN)

(72) Inventors: Wanping Pan, Beijing (CN); Enlong Wu, Beijing (CN); Changjia Fu, Beijing (CN); Jianming Huang, Beijing (CN); Hailong Yu, Beijing (CN); Yabin Lin, Beijing (CN); Xuezhen Su, Beijing (CN); Xiaobo Jia, Beijing (CN); Chuanhe Jing, Beijing (CN)

(73) Assignees: Fuzhou BOE Optoelectronics Technology Co., Ltd., Fujian (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/271,037

(22) PCT Filed: Oct. 25, 2021

(86) PCT No.: PCT/CN2021/126057
§ 371 (c)(1),
(2) Date: Jul. 5, 2023

(87) PCT Pub. No.: WO2022/183746
PCT Pub. Date: Sep. 9, 2022

(65) Prior Publication Data
US 2024/0012289 A1    Jan. 11, 2024

(30) Foreign Application Priority Data

Mar. 5, 2021 (CN) .......................... 202110243734.2

(51) Int. Cl.
*G02F 1/13357* (2006.01)

(52) U.S. Cl.
CPC .............................. *G02F 1/133608* (2013.01)

(58) Field of Classification Search
CPC .................................................. G02F 1/133608
See application file for complete search history.

(56) References Cited

U.S. PATENT DOCUMENTS

| 11,862,051 B2 * | 1/2024 | Wang .................. H01L 25/0753 |
| 2006/0291242 A1 | 12/2006 | Ko |

(Continued)

FOREIGN PATENT DOCUMENTS

| CN | 102798049 A | 11/2012 |
| CN | 103672724 A | 3/2014 |

(Continued)

OTHER PUBLICATIONS

English translation of Liu CN 203907348, published Oct. 2014 (Year: 2014).*

(Continued)

*Primary Examiner* — Evan P Dzierzynski
(74) *Attorney, Agent, or Firm* — IPro, PLLC

(57) ABSTRACT

A backlight module includes: a first optical element and a fixing frame arranged around the first optical element. The fixing frame includes a first edge frame and a second edge frame that are oppositely arranged, and a third edge frame and a fourth edge frame that are oppositely arranged. The side of each edge frame of the fixing frame facing the first optical element is provided with a plurality of adhesive tapes that are independent of each other and extend in an extension direction of the each edge frame. The first optical element is fixed to the fixing frame through the adhesive tapes.

16 Claims, 10 Drawing Sheets

(56) References Cited

U.S. PATENT DOCUMENTS

| | | | |
|---|---|---|---|
| 2013/0263488 A1* | 10/2013 | Wu | G02F 1/133308 |
| | | | 156/305 |
| 2016/0291361 A1 | 10/2016 | Fu et al. | |
| 2016/0363718 A1 | 12/2016 | Zhou et al. | |
| 2017/0176805 A1* | 6/2017 | Zhou | G02F 1/133305 |
| 2019/0011118 A1 | 1/2019 | Zhang et al. | |
| 2021/0333640 A1* | 10/2021 | Chen | G02F 1/133608 |
| 2022/0187936 A1* | 6/2022 | Cheng | G02F 1/13338 |

FOREIGN PATENT DOCUMENTS

| | | | | |
|---|---|---|---|---|
| CN | 103901654 A | | 7/2014 | |
| CN | 203907348 U | * | 10/2014 | |
| CN | 104749809 A | | 7/2015 | |
| CN | 105158953 A | * | 12/2015 | .......... G02F 1/1333 |
| CN | 105757537 A | | 7/2016 | |
| CN | 208607472 U | | 3/2019 | |
| CN | 208721951 U | | 4/2019 | |
| CN | 208721958 U | | 4/2019 | |
| CN | 112859425 A | | 5/2021 | |
| JP | 2008003313 A | | 1/2008 | |

OTHER PUBLICATIONS

English translation of Yu CN-105158953, pub Sep. 2015 (Year: 2015).*
CN202110243734.32 first office action.
PCT/CN2021/126057 international search report.

* cited by examiner

BACKLIGHT MODULE AND METHOD FOR MANUFACTURING SAME, AND DISPLAY DEVICE

CROSS REFERENCE TO RELATED APPLICATION

The present disclosure is a National Stage of International Application No. PCT/CN2021/126057, filed Oct. 25, 2021, which claims the benefit of priority to Chinese Patent Application No. 202110243734.2, filed with the China National Intellectual Property Administration (CNIPA) on Mar. 5, 2021 and entitled "BACKLIGHT MODULE AND MANUFACTURING METHOD THEREFOR, AND DISPLAY DEVICE", the entire content of which is incorporated herein by reference.

TECHNICAL FIELD

The present disclosure relates to the technical field of display, and particularly to a backlight module and a manufacturing method therefor, and a display device.

BACKGROUND

An optical film sheet of an existing display device is highly likely to wrinkle due to heat-expansion and cold-contraction, causing uneven brightness. Especially in a large-sized display module, a large-area film sheet requires a large expansion space. In order to ensure a screen-to-body ratio, expansion of the film sheet is generally limited by the space, so the film sheet will wrinkle.

It can be seen that the existing display device has the technical problems of a sheet wrinkle defect and inferior display quality.

SUMMARY

The present disclosure provides a backlight module and a manufacturing method therefor, and a display device, which are used for avoiding a sheet wrinkle defect and improving display quality.

In a first aspect, embodiments of the present disclosure provide a backlight module. The backlight module includes:
a first optical element; and
a fixing frame arranged around the first optical element.

The fixing frame includes a first edge frame and a second edge frame that are oppositely arranged, and a third edge frame and a fourth edge frame that are oppositely arranged. A side of each edge frame of the fixing frame facing the first optical element is provided with a plurality of adhesive tapes that are independent of each other and extend in an extension direction of the each edge frame. The first optical element is fixed to the fixing frame through the adhesive tapes.

In a possible implementation mode, the backlight module includes a second optical element and a third optical element that sequentially face away from the first optical element. The second optical element and the third optical element are both provided with a plurality of hanging lug holes. With a plurality of hanging lugs arranged on the fixing frame passing through the corresponding hanging lug holes, the second optical element and the third optical element are fixed to the fixing frame.

In a possible implementation mode, an extension length of the first edge frame and an extension length of the second edge frame are both a first extension length. An extension length of the third edge frame and an extension length of the fourth edge frame are both a second extension length. The first extension length is greater than the second extension length. Recess regions for the hanging lugs to be fixed are reserved on each edge frame. The recess regions on the first edge frame and the second edge frame are both provided with the hanging lugs, and the recess regions on at least one of the third edge frame or the fourth edge frame are not provided with the hanging lugs.

In a possible implementation mode, sizes of the hanging lug holes corresponding to any edge frame in a length direction of the edge frame gradually increase in a direction away from a center of the fixing frame.

In a possible implementation mode, an extension length of any recess region along the edge frame on which the recess region is reserved is a preset length, and a distance between any two adjacent recess regions on the edge frame on which the two adjacent recess regions are reserved is within a range of (100 mm, 300 mm).

In a possible implementation mode, on the first edge frame, a distance between any two adjacent recess regions is a first preset distance, and on the second edge frame, a distance between any two adjacent recess regions is a second preset distance different from the first preset distance.

In a possible implementation mode, on the first edge frame, a distance between two adjacent recess regions away from the center of the fixing frame is greater than a distance between two adjacent recess regions close to the center of the fixing frame. On the second edge frame, a distance between any two adjacent recess regions is the same preset distance.

In a possible implementation mode, on any edge frame, there are at least a first recess region and a second recess region that are arranged at two ends of the edge frame respectively, and at least one adhesive tape is arranged in space between the first recess region and the second recess region.

In a possible implementation mode, at least part of the adhesive tape is attached to the first recess region, and at least part of the adhesive tape is attached to the second recess region.

In a possible implementation mode, on any edge frame, a length of any adhesive tape is within a range of [a, 2a+d]. 'a' represents a distance between any two adjacent recess regions, and 'd' represents an extension length of the recess region along the edge frame.

In a possible implementation mode, on any edge frame, a distance between any two adjacent adhesive tapes is within a range of [a+2d, 2a+3d]. 'a' represents a distance between any two adjacent recess regions, and 'd' represents an extension length of the recess region along the edge frame.

In a possible implementation mode, on the fixing frame, the recess region that corresponds to the adhesive tape and is not provided with the hanging lug is filled with rubber, and a thickness of the rubber is equal to a depth of the recess region.

In a second aspect, embodiments of the present disclosure provide a display device. The display device includes the above backlight module.

In a third aspect, embodiments of the present disclosure provide a manufacturing method for a backlight module.

The method includes:
arranging a plurality of adhesive tapes independent of each other on a side of each edge frame of a fixing frame facing a first optical element, where the fixing frame is arranged around the first optical element, and the fixing frame includes a first edge frame and a second edge frame that are oppositely arranged, and a third edge frame and a fourth edge frame that are oppositely arranged; and fixing the first optical element to the fixing frame through the adhesive tapes.

In a possible implementation mode, under the condition that the backlight module includes a second optical element and a third optical element that sequentially face away from the first optical element, after the fixing of the first optical element to the fixing frame through the adhesive tapes, the method further includes:

with a plurality of hanging lugs arranged on the fixing frame passing through a plurality of hanging lug holes provided on the second optical element and the third optical element, fixing the second optical element and the third optical element to the fixing frame.

In a possible implementation mode, before the arranging a plurality of adhesive tapes independent of each other on a side of each edge frame of a fixing frame facing a first optical element, the method further includes:

providing recess regions for the hanging lugs to be fixed on each edge frame of the fixing frame; and fixing the hanging lugs in the recess regions on the first edge frame and the second edge frame.

The recess regions on at least one of the third edge frame or the fourth edge frame is not provided with the hanging lugs. An extension length of the first edge frame and an extension length of the second edge frame are both a first extension length. An extension length of the third edge frame and an extension length of the fourth edge frame are both a second extension length. The first extension length is greater than the second extension length.

In a possible implementation mode, the arranging a plurality of adhesive tapes independent of each other on a side of each edge frame of a fixing frame facing a first optical element includes:

arranging at least one adhesive tape in space between a first recess region and a second recess region at two ends of any edge frame.

The adhesive tape is arranged on a side of the fixing frame facing the first optical element.

In a possible implementation mode, the arranging a plurality of adhesive tapes independent of each other on a side of each edge frame of a fixing frame facing a first optical element includes:

attaching at least part of the adhesive tape to the first recess region, and attaching at least part of the adhesive tape to the second recess region.

In a possible implementation mode, after the fixing the hanging lugs in the recess regions on the first edge frame and the second edge frame, the method further includes:

filling the recess regions on the third edge frame or the fourth edge frame not provided with the hanging lugs with rubber.

A thickness of the rubber is equal to a depth of the recess region.

DETAILED DESCRIPTION

Figure 1:
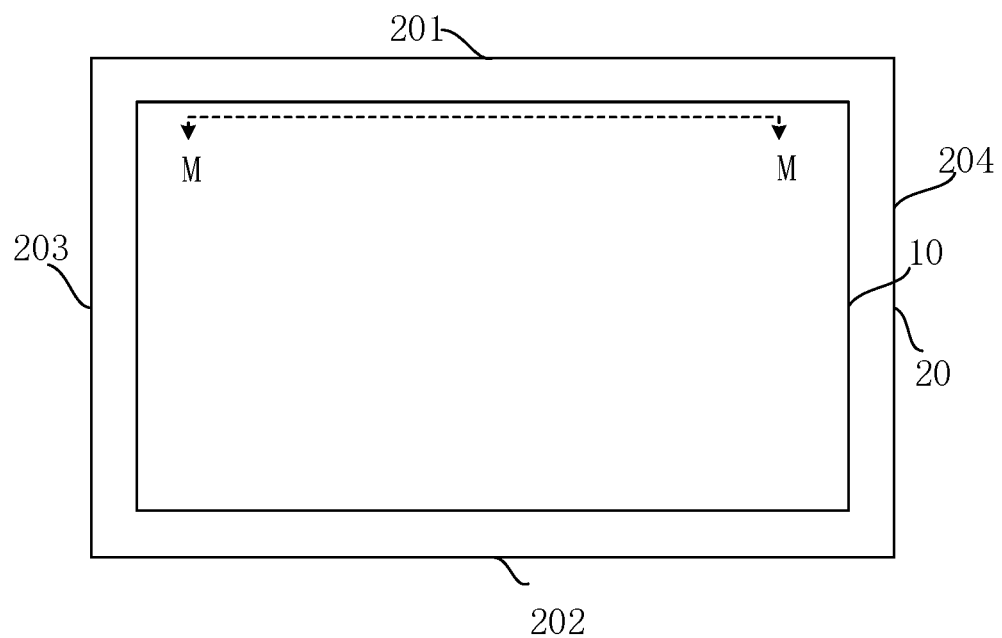
FIG. 1 is a schematic structural diagram of a top view of a backlight module according to an embodiment of the present disclosure.

In order to make objectives, technical solutions and advantages of embodiments of the present disclosure clearer, technical solutions in the embodiments of the present disclosure will be clearly and completely described below in combination with accompanying drawings in the embodiments of the present disclosure. Apparently, the described embodiments are merely some embodiments rather than all embodiments of the present disclosure. In addition, embodiments of the present disclosure and features in the embodiments can be combined with each other without conflict. On the basis of the described embodiments of the present disclosure, all other embodiments obtained by those of ordinary skill in the art without making creative efforts all fall within the scope of protection of the present disclosure.

Unless otherwise defined, technical terms or scientific terms used in the present disclosure should have the ordinary meanings understood by those of ordinary skill in the art to which the present disclosure belongs. "First", "second" and other similar words used in the present disclosure do not indicate any order, quantity or importance, but are merely used to distinguish between different components. "Comprise", "include" or other similar words used in the present disclosure mean that an element or object appearing before the word contains elements or objects listed after the word and its equivalents, without excluding other elements or objects.

It should be noted that sizes and shapes of all figures in accompanying drawings do not reflect true scales and are merely intended to illustrate contents of the present disclosure. Moreover, the same or similar reference numerals denote the same or similar elements or elements having the same or similar functions throughout.

In the prior art, a sheet wrinkle is one of the common defects in the development of a display module. A sheet wrinkle defect mainly causes uneven brightness of the display module from a side view in a lighting state, especially in a normal lighting test for a screen or a temperature and humidity reliability test. A backlight film sheet is generally an organic resin product, which has the characteristics of moisture absorption, heat absorption and expansion. Thus, certain sheet expansion space will be reserved when the backlight module is designed. In particular, a backlight film sheet has a large area in a large display module, so expansion space required by the backlight film sheet is also relatively large accordingly. In order to give consideration to a relatively high screen-to-body ratio, reservation of the expansion space is limited to a certain extent. In this case, sheet expansion will be limited by space, and a sheet wrinkle defect will occur.

At present, when the sheet wrinkle defect occurs, the reason why a diffusion plate in the existing backlight module warps is that the diffusion plate has a too large transverse size, and a fixing method thereof is full-glue fixation. Since stress on a periphery of the diffusion plate is too large, especially in a high-temperature and high-humidity reliability test, expansion space on the periphery is limited, and expansion is concentrated at an interior of the diffusion plate. In addition, since the film sheet in the backlight module has a relatively large transverse size, a reserved expansion amount is insufficient. In the high-temperature and high-humidity reliability test, the film sheet expands and interferes with a position for limiting the hanging lug, such that a sheet wrinkle defect occurs, and display quality is reduced.

In view of the above, embodiments of the present disclosure provide a backlight module and a manufacturing method therefor, and a display device, which are used for avoiding a sheet wrinkle defect and improving display quality.

Figure 2:
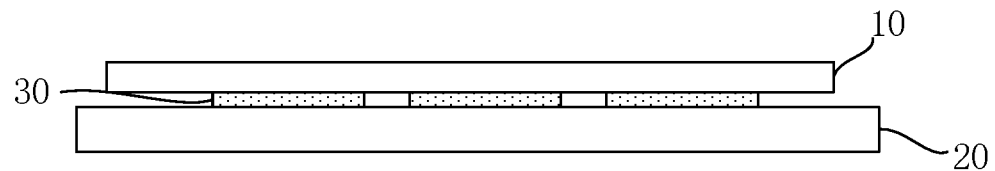
FIG. 2 is a schematic structural diagram of a section in direction MM in FIG. 1.

As shown in FIGS. 1 and 2, a schematic structural diagram of a top view of a backlight module according to an embodiment of the present disclosure is shown in FIG. 1, and a schematic structural diagram of a section in direction MM in FIG. 1 is shown in FIG. 2. The backlight module includes a first optical element 10 and a fixing frame 20 arranged around the first optical element 10.

The fixing frame 20 includes a first edge frame 201 and a second edge frame 202 that are oppositely arranged, and a third edge frame 203 and a fourth edge frame 204 that are oppositely arranged. A side of each edge frame of the fixing frame 20 facing the first optical element 10 is provided with a plurality of adhesive tapes 30 that are independent of each other and extend in an extension direction of the each edge frame. The first optical element 10 is fixed to the fixing frame 20 through the adhesive tapes 30. It should be noted that the first edge frame 201, the second edge frame 202, the third edge frame 203 and the fourth edge frame 204 may all belong to edge portions of the fixing frame 20.

In embodiments of the present disclosure, the fixing frame 20 may be made of aluminum or other metals, which are not limited herein. The fixing frame 20 includes a first edge frame 201 and a second edge frame 202 that are oppositely arranged, and a third edge frame 203 and a fourth edge frame 204 that are oppositely arranged. The fixing frame 20 is arranged around the first optical element 10. A side of each edge frame of the fixing frame 20 facing the first optical element 10 is provided with a plurality of adhesive tapes 30 that are independent of each other and extend in an extension direction of the edge frame. Extension lengths of all the adhesive tapes 30 may be the same or different, which may be set according to practical application requirements. In addition, the same quantity of or different quantities of adhesive tapes 30 are arranged on the respective edge frames, which may be set according to a specific length of a corresponding edge frame and a length of each adhesive tape 30 during practical application.

In some implementation processes, the first optical element 10 is fixed to the fixing frame 20 through the adhesive tapes 30 independent of each other, so as to ensure stability of the backlight module. In addition, since the adhesive tapes 30 arranged on each edge frame of the fixing frame 20 are independent of each other, compared with full-adhesive bonding between the first optical element 10 and the fixing frame 20 in the prior art, an adhesive force between the adhesive tapes 30 and the fixing frame 20 is reduced. Moreover, the performance of the adhesive tapes 30 of which recoverable deformation occurs corresponding to expansion and contraction of an optical element is improved, such that when the first optical element 10 expands, by means of relatively small resistance of recoverable deformation of the adhesive tapes 30, the first optical element 10 shifts to a certain extent with respect to the fixing frame and this shift may be in a direction facing away from a center of the fixing frame 20. In addition, when the first optical element 10 expands, slight deformation occurs on the adhesive tapes 30 having a certain thickness, and the first optical element 10 expands in a deformation direction of the adhesive tapes 30. In this way, an expansion degree of the first optical element close to the center of the fixing frame 20 is weakened, so as to avoid a wrinkle defect of the film sheet corresponding to the first optical element 10 and further improve display quality. Contraction of the first optical element 10 is similar and will not be repeated again.

Figure 3:
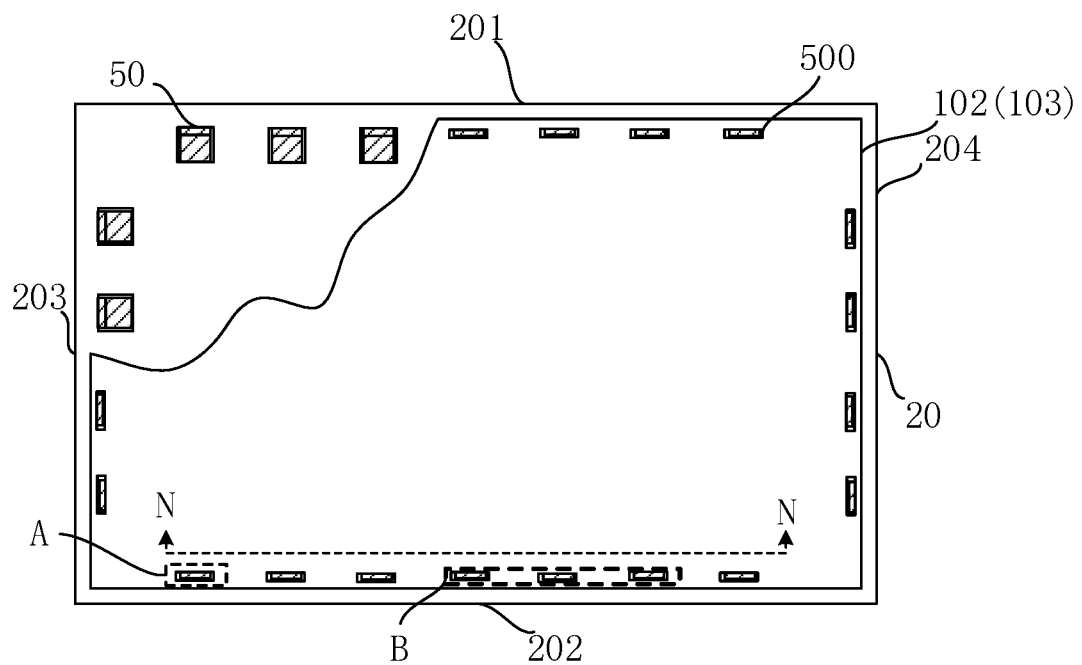
FIG. 3 is a schematic structural diagram of a top view of a backlight module according to an embodiment of the present disclosure.
Figure 4:
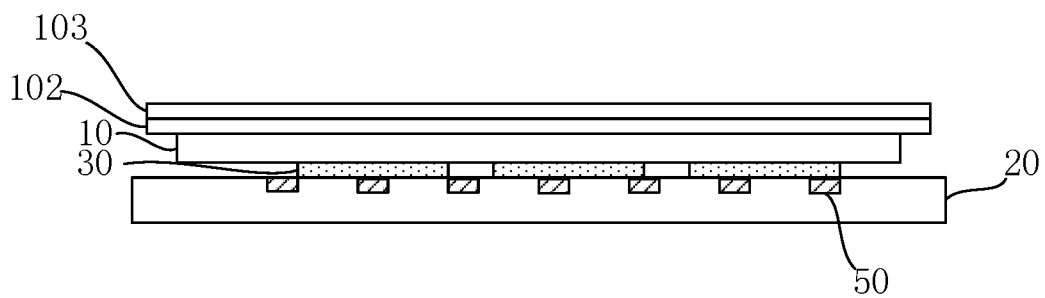
FIG. 4 is a schematic structural diagram of a section in direction NN in FIG. 3.
Figure 5:
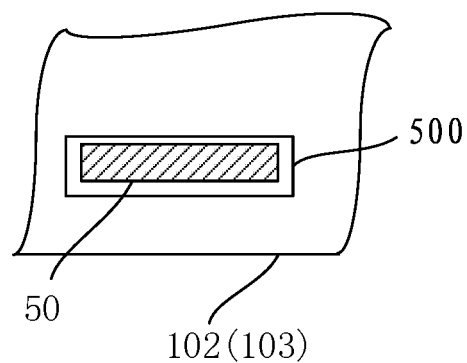
FIG. 5 is a partial enlarged view of a structure corresponding to region A marked with a dashed line box in FIG. 3.

In embodiments of the present disclosure, as shown in FIGS. 3-5, a schematic structural diagram of a top view of a backlight module is shown in FIG. 3. In FIG. 3, an upper left corner region in which a wavy line is located shows a structure of the fixing frame 20 without a related optical film sheet layer. A schematic structural diagram of a section in direction NN in FIG. 3 is shown in FIG. 4. A partial enlarged view of a structure corresponding to region A marked with a dashed line box in FIG. 3 is shown in FIG. 5. For example, the backlight module includes a second optical element 102 and a third optical element 103 that sequentially face away from the first optical element 10. The second optical element 102 and the third optical element 103 are both provided with a plurality of hanging lug holes 500. With a plurality of hanging lugs 50 arranged on the fixing frame 20 passing through the corresponding hanging lug holes 500, the second optical element 102 and the third optical element 103 are fixed to the fixing frame 20.

In some implementation processes, the backlight module may be a direct-type backlight source, the first optical element 10 may be a diffusion plate, the second optical element 102 may be a prism sheet, and the third optical element 103 may be a diffusion sheet. In this case, a thickness of the first optical element 10 is greater than a thickness of the third optical element 103. The first optical element 10 is fixed to the fixing frame 20 by means of the adhesive tapes arranged on the fixing frame 20. By means of the adhesive tapes 30 arranged on the fixing frame 20, stability of the first optical element 10 on the fixing frame 20 is ensured, and further stability of the backlight module is ensured. The second optical element 102 and the third optical element 103 are fixed to the fixing frame 20 with a plurality of hanging lugs 50 arranged on the fixing frame 20 passing through the corresponding hanging lug holes 500. The quantity of hanging lugs 50 arranged on the fixing frame 20 may be set according to practical application, and is not limited herein. In some implementation processes, with the hanging lugs 50 arranged on the fixing frame 20 passing through the hanging lug holes 500 of corresponding elements, stability of the second optical element 102 and the third optical element 103 on the fixing frame 20 is ensured, and further stability of the backlight module is ensured.

In some implementation processes, light from a backlight source in the backlight module may be modulated by means of a plurality of film layers included in the backlight module, so as to ensure use performance of the backlight module. Under the condition that the backlight module includes a quantum dot film, color light from the backlight source may be purer by means of the quantum dot film. After the backlight module is applied to a liquid crystal display device, display quality of the liquid crystal display device is ensured. In addition, during practical application, those skilled in the art can select a film material included in the backlight module according to actual use requirements. For example, the backlight module may further include a reflective sheet, a quantum dot film, etc. in addition to a diffusion plate, a prism sheet and a diffusion sheet that sequentially face away from the fixing frame 20, which is not limited herein. Correspondingly, those skilled in the art can select a sequence of all optical film layers in the backlight module according to actual use requirements, which is not limited herein.

Figure 6:
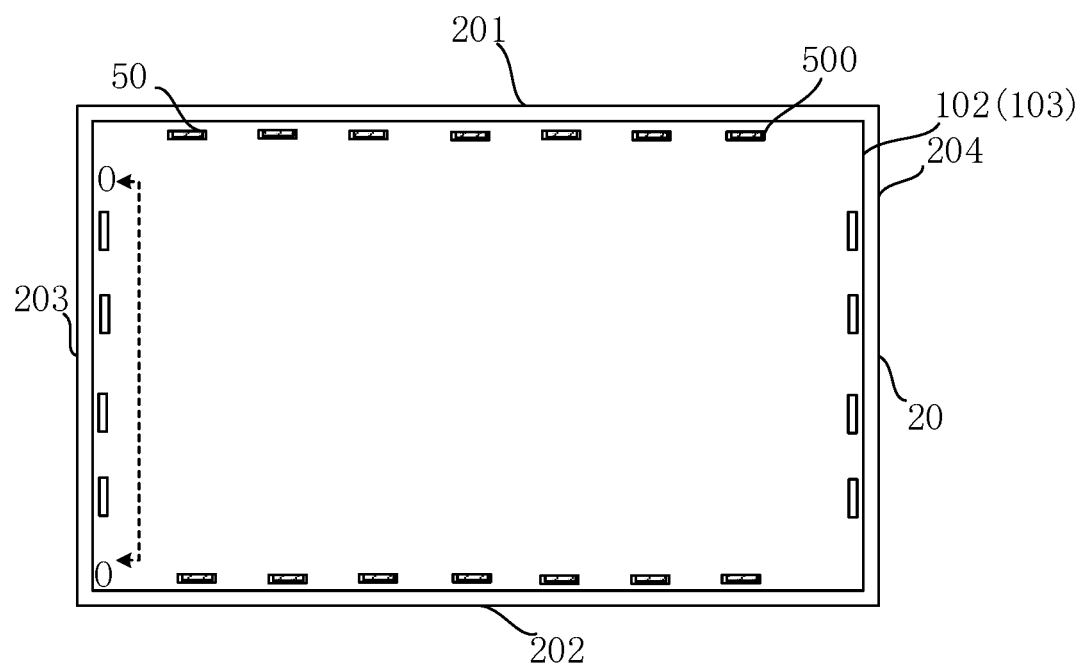
FIG. 6 is a schematic structural diagram of a top view of a backlight module according to an embodiment of the present disclosure.
Figure 7:
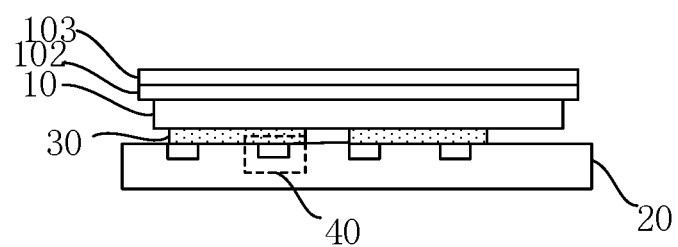
FIG. 7 is a schematic structural diagram of a section in direction OO in FIG. 6.

In embodiments of the present disclosure, as shown in FIGS. 6 and 7, a schematic structural diagram of a top view of a backlight module is shown in FIG. 6, and a schematic structural diagram of a section in direction OO in FIG. 6 is shown in FIG. 7. For example, an extension length of the first edge frame 201 and an extension length of the second edge frame 202 are both a first extension length. An extension length of the third edge frame 203 and an extension length of the fourth edge frame 204 are both a second extension length. The first extension length is greater than the second extension length. A recess region 40 for the hanging lug 50 to be fixed is reserved on each edge frame. The recess regions 40 on the first edge frame 201 and the second edge frame 202 are both provided with the hanging lugs 50, and the recess regions 40 on at least one of the third edge frame 203 or the fourth edge frame 204 are not provided with the hanging lugs 50.

In some implementation processes, an extension length of the first edge frame 201 and an extension length of the second edge frame 202 are both a first extension length. An extension length of the third edge frame 203 and an extension length of the fourth edge frame 204 are both a second extension length. The first extension length is greater than the second extension length. For example, the first extension length is 2.2 m, and the second extension length is 1.2 m. Those skilled in the art can set the extension length of each edge frame of the fixing frame 20 according to an actual size of the backlight module, which is not limited herein. In addition, recess regions 40 for the hanging lugs 50 to be fixed are reserved on each edge frame of the fixing frame 20. The recess regions 40 on the first edge frame 201 and the second edge frame 202 are both provided with the hanging lugs 50, and the recess regions 40 on at least one of the third edge frame 203 and the fourth edge frame 204 are not provided with the hanging lugs 50. As shown in FIG. 6, the third edge frame 203 is not provided with the hanging lugs 50, and the fourth edge frame 204 is neither provided with the hanging lugs 50. For another example, the third edge frame 203 is not provided with the hanging lugs 50, but the fourth edge frame 204 is provided with the hanging lugs 50. For yet another example, it is the fourth edge frame 204 that is not provided with the hanging lug 50. Those skilled in the art can set actual distribution of the hanging lugs 50 according to horizontal and vertical requirements of the backlight module, which is not limited herein. Under the condition that the backlight module is vertically placed in an extension direction of a longer side, a shorter side of the fixing frame 20 facing away from a placement surface may be provided with the hanging lug 50, so as to avoid the influence of gravity of the first optical element 10 and improve stability of the backlight module.

In some implementation processes, when the second optical element 102 and the third optical element 103 expand, since the corresponding optical elements may freely contract towards an edge frame not provided with the hanging lugs 50, the second optical element 102 and the third optical element 103 contract along the edge frame not provided with the hanging lugs 50. In this case, since the edge frame not provided with the hanging lug 50 is a shorter edge frame of the fixing frame 20, when the second optical element 102 and the third optical element 103 expand, the second optical element 102 and the third optical element 103 may freely contract towards the edge frame not provided with the hanging lugs 50, especially longer sides of the corresponding optical elements may freely contract towards shorter sides. In this way, interference degrees between the second optical element 102 and the third optical element 103 and the hanging lugs 50 are greatly reduced, wrinkle degrees of the second optical element 102 and the third optical element 103 are reduced, a sheet wrinkle defect is avoided, and further display quality is ensured.

Figure 8:
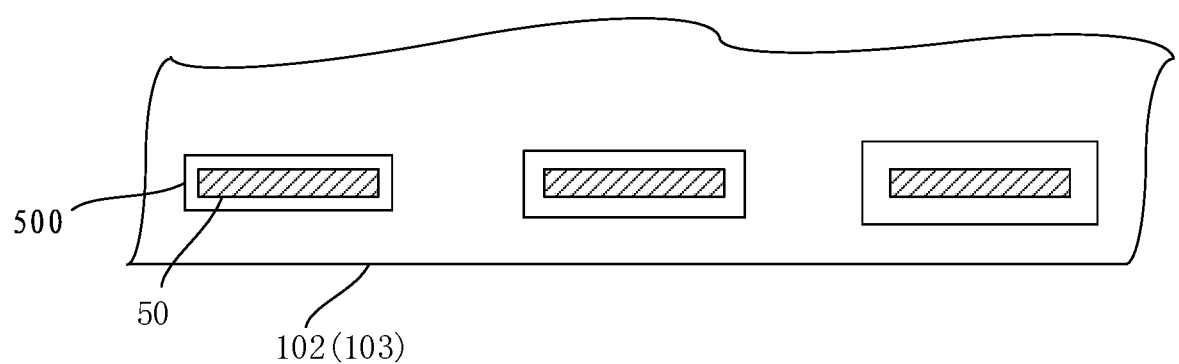
FIG. 8 is a partial enlarged view of a structure corresponding to region B marked with a dashed line box in FIG. 3.

In some embodiments of the present disclosure, a partial enlarged view of a structure corresponding to region B marked with a dashed line box in FIG. 3 is shown in FIG. 8. For example, sizes of the hanging lug holes 500 corresponding to any edge frame in a length direction of the edge frame gradually increase in a direction facing away from a center of the fixing frame 20. In some implementation processes, sizes of all the hanging lugs 50 in the length direction of the edge frame are not completely, but may be approximately equal to each other. The size of any hanging lug hole 500 in the length direction of the edge frame is greater than the size of the corresponding hanging lug 50 in the length direction of the edge frame. In this case, the hanging lug 50 can be ensured to pass through the hanging lug hole 500 to fix the corresponding optical element, thereby ensuring stability of the backlight module. In addition, in some implementation processes, since the sizes of the hanging lug holes 500 corresponding to any edge frame in the length direction of the edge frame gradually increase in the direction facing away from the center of the fixing frame 20, that is, the spaces reserved in the hanging lug holes 500 for the hanging lugs 50 gradually increase. When the second optical element 102 and the third optical element 103 expand, and the second optical element 102 and the third optical element 103 are fixed to the fixing frame by means of the hanging lugs 50, since the spaces reserved in the hanging lug holes 500 in the direction facing away from the center of the fixing frame gradually increase, the second optical element 102 and the third optical element 103 may freely move in the space reserved in the hanging lug holes 500. Therefore, interference between the corresponding optical element and the hanging lug is avoided, a sheet wrinkle defect is avoided, and further display quality is ensured.

In embodiments of the present disclosure, an extension length of any recess region 40 along the edge frame is a preset length, and a distance between any two adjacent recess regions 40 on any edge frame is within a range of (100 mm, 300 mm). For example, the distance between any two adjacent recess regions 40 on any edge frame is 150 mm. For another example, the distance is 200 mm. In this way, the film sheet in the backlight module can be prevented from being over-positioned, and the situation that since a distance is set to be excessively large, the film sheet in the backlight module is not effectively fixed and thus falls off can be avoided.

In embodiments of the present disclosure, arrangement modes of the recess region 40 include, but are not limited to the following two arrangement modes.

Figure 9:
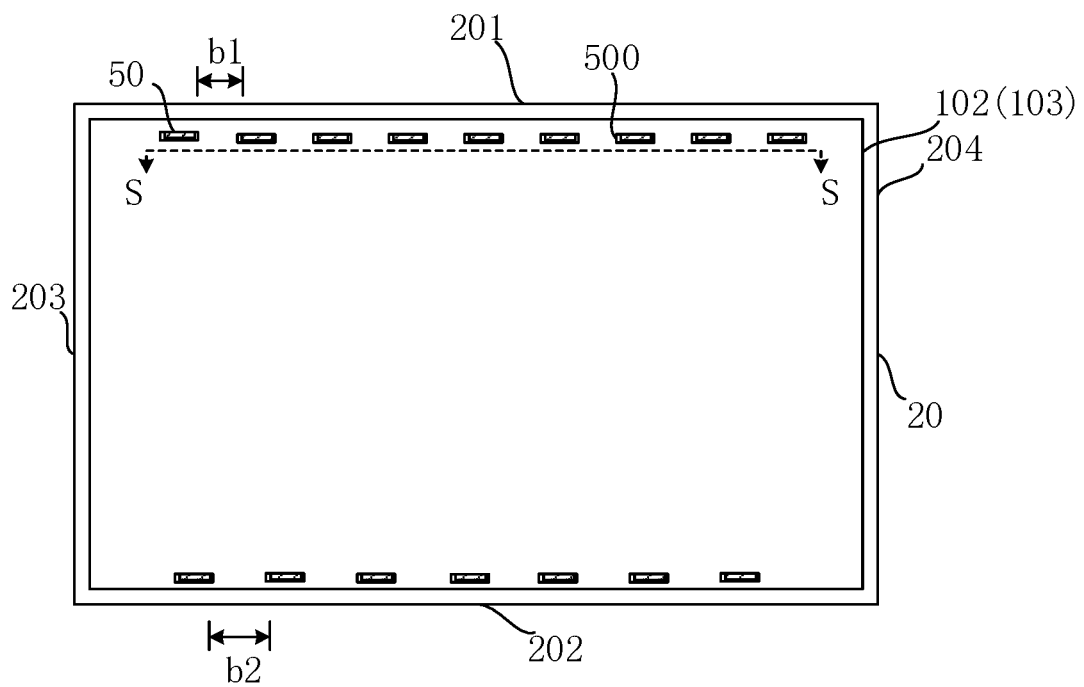
FIG. 9 is a schematic structural diagram of a top view of a backlight module according to an embodiment of the present disclosure.

A schematic structural diagram of a top view of a backlight module according to a first arrangement mode is shown in FIG. 9. For example, on the first edge frame 201, a distance between any two adjacent recess regions 40 is a first preset distance, and on the second edge frame 202, a distance between any two adjacent recess regions 40 is a second preset distance different from the first preset distance. In some implementation processes, under the condition that the recess regions 40 are provided with the hanging lugs 50, a distance between two recess regions 40 corresponds to a distance between two hanging lugs 50. As shown in FIG. 9, the first preset distance is b1, the second preset distance is b2, the first preset distance b1 is less than the second preset distance b2, and the quantity of the hanging lugs 50 arranged on the first edge frame 201 is greater than the quantity of the hanging lugs 50 arranged on the second edge frame 202. It should be noted that the distances are not completely but may be approximately equal to the first preset distance and the second preset distance. In this way, all the recess regions 40 on the first edge frame 201 may be axisymmetrically distributed, and all the recess regions 40 on the second edge frame 202 may be axisymmetrically distributed. Correspondingly, since the first preset distance between any two adjacent recess regions 40 on the first edge frame 201 is different from the second preset distance between any two adjacent recess regions 40 on the second edge frame 202, all the recess regions 40 on the first edge frame 201 and all the recess regions on the second edge frame 202 may be asymmetrically distributed. In this way, a foolproof design of a related film sheet can be ensured, and a mounting speed of the related film sheet on the fixing frame 20 is ensured.

Figure 10:
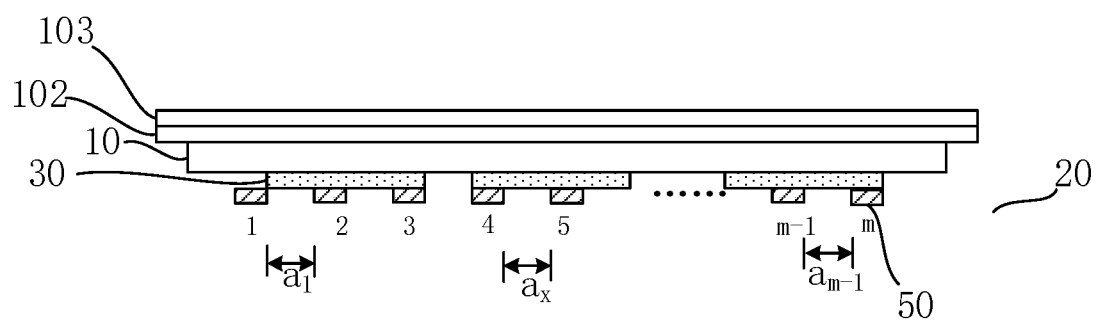
FIG. 10 is a schematic structural diagram of a section in direction SS in FIG. 9.

In some implementation processes, under the condition that the recess regions 40 on the first edge frame 201 and the second edge frame 202 are arranged in the first arrangement mode, all the recess regions 40 on the third edge frame 203 and all the recess regions 40 on the fourth edge frame 204 may be axisymmetrically distributed as shown in FIG. 10. In addition, the distance between two adjacent recess regions 40 on the third edge frame 203 and the distance between two adjacent recess regions 40 on the fourth edge frame 204 may be set according to practical application requirements. The set distance may be the same as or different from the first preset distance, may be set according to practical application requirements, and is not limited herein.

In some implementation processes, in a case in which the distance between any two adjacent recess regions 40 on the first edge frame 201 of the fixing frame 20 is the first preset distance as shown in FIG. 9, in combination with a schematic structural diagram of a section in direction SS in FIG. 9 shown in FIG. 10, a quantity of 'm' recess regions 40 are arranged on this edge. Correspondingly, the hanging lugs 50 arranged in the recess regions 40 are sequentially numbered 1, 2, . . . , m, and 'm' is an integer greater than 3. Considering process errors, a relation between the distances of the recess regions 40 on this edge is: $a_1 \approx a_x \approx a_{m-1}$, where "≈" means approximately equal. The distance between the hanging lug 50 numbered 1 and the hanging lug 50 numbered 2 is $a_1$, the distance between the two hanging lugs 50 located at the center of the edge frame is $a_x$, and the distance between the hanging lug 50 numbered m and the hanging lug 50 numbered (m−1) is $a_{m-1}$. That is, all the recess regions 40 on this edge are axisymmetrically distributed.

Figure 11:
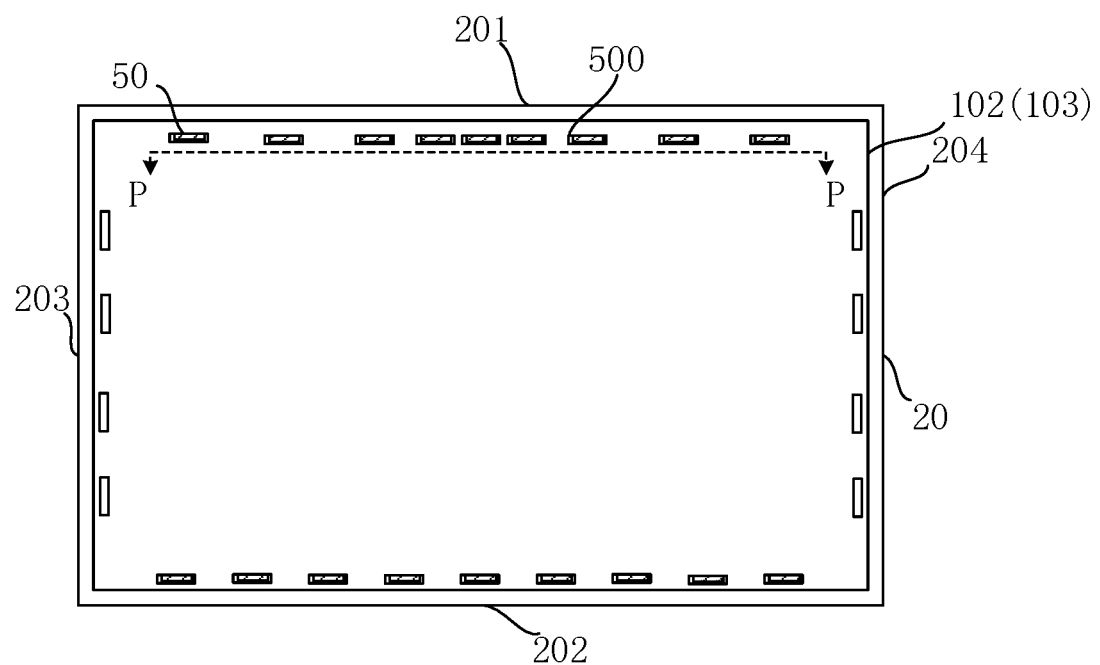
FIG. 11 is a schematic structural diagram of a top view of a backlight module according to an embodiment of the present disclosure.

A schematic structural diagram of a top view of a backlight module according to a second arrangement mode is shown in FIG. 11. For example, on the first edge frame 201, a distance between two adjacent recess regions 40 away from the center of the fixing frame 20 is greater than a distance between two adjacent recess regions 40 close to the center of the fixing frame 20. On the second edge frame 202, a distance between any two adjacent recess regions 40 is the same preset distance. In this way, all the recess regions 40 on the first edge frame 201 and all the recess regions 40 on the second edge frame 202 are non-axisymmetrically distributed. All the recess regions 40 on the first edge frame 201 may be axisymmetrically distributed, and all the recess regions 40 on the second edge frame 202 may be axisymmetrically distributed, as shown in FIG. 11. In addition, in the second arrangement mode, all the recess regions 40 on the third edge frame 203 and all the recess regions 40 on the fourth edge frame 204 may be axisymmetrically distributed, or may be non-axisymmetrically distributed. As shown in FIG. 11, nine recess regions 40 are arranged on the first edge frame 201, nine recess regions 40 are arranged on the second edge frame 202, four recess regions 40 are arranged on the third edge frame 203, and four recess regions 40 are arranged on the fourth edge frame 204. Those skilled in the art can arrange the recess regions 40 on each edge frame according to practical application, which is not limited herein.

Figure 12:
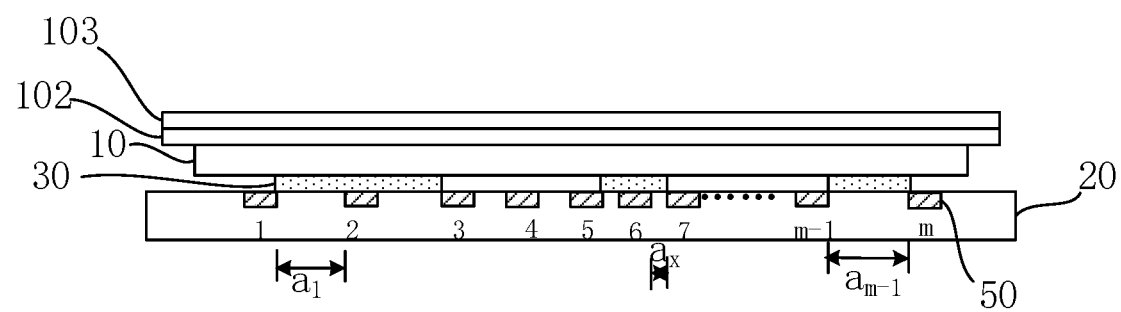
FIG. 12 is a schematic structural diagram of a section in direction PP in FIG. 11.

In combination with a schematic structural diagram of a section in direction PP in FIG. 11 as shown in FIG. 12, under the condition that the second arrangement mode is used, a relation between the distances between the recess regions 40 on this edge is $a_x < a_1 \approx a_{m-1}$. In some implementation processes, the recess regions 40 on the first edge frame 201 may be designed to be axisymmetrical. In this case, since all the recess regions 40 on the first edge frame 201 and all the recess regions 40 on the second edge frame 202 are non-axisymmetrically distributed, after the hanging lugs 50 are arranged in the recess regions 40, a related film sheet in the first optical element 10 may be rapidly mounted in the backlight module by means of the corresponding hanging lugs 50. In addition, through the non-axisymmetric distribution of all the recess regions 40 on the entire fixing frame 20, a foolproof design of the related film sheet can be ensured. After the hanging lugs 50 are arranged in the corresponding recess regions, it is convenient to mount the related film sheet to the fixing frame 20, thereby improving manufacturing efficiency of the backlight module.

In addition, on the first edge frame 201, the distance between two adjacent recess regions 40 away from the center of the fixing frame 20 is greater than the distance between two adjacent recess regions 40 close to the center of the fixing frame 20. In this case, after the hanging lugs 50 are mounted to the corresponding recess regions 40, sufficient expansion space is reserved between the hanging lugs 50 away from the center of the fixing frame 20, such that when the first optical element 10 expands, free expansion of the first optical element 10 facing away from the center of the fixing frame 20 can be ensured. Moreover, interference between the hanging lug 50 at an edge position and a corresponding film sheet can be effectively avoided such that internal expansion of the corresponding film sheet can be effectively reduced. Further, a sheet wrinkle defect is avoided, and display quality is improved.

Further, in addition to the above two arrangement modes for designing the recess regions 40 on the fixing frame 20, those skilled in the art can arrange the recess regions 40 in other modes according to practical application requirements. For example, the distance between any two adjacent hanging lugs 50 arranged on any edge frame may be set to be the same preset distance. Those skilled in the art can set a value of the preset distance according to practical application requirements, which is not limited herein.

Figure 13:
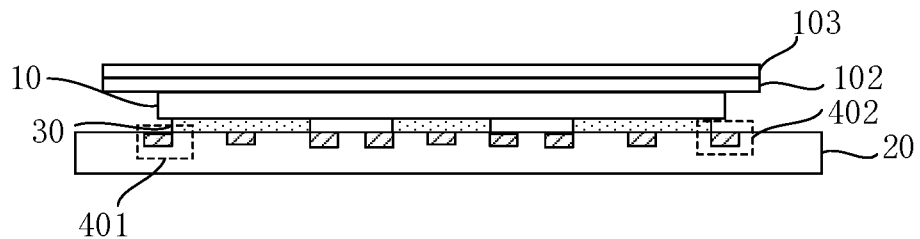
FIG. 13 is a schematic structural diagram of another section in direction PP in FIG. 11.

In embodiments of the present disclosure, distribution of the adhesive tapes 30 in the backlight module is described in combination with FIGS. 11 and 13. Another schematic structural diagram of a section in direction PP in FIG. 11 is shown in FIG. 13. For example, on any edge frame, there are at least a first recess region 401 and a second recess region 402 that are arranged at two ends of this edge respectively, and at least one adhesive tape 30 is arranged in space between the first recess region 401 and the second recess region 402. That is to say, at least one adhesive tape 30 is arranged between two recess regions located at two ends of a single edge. In some implementation processes, at least one adhesive tape 30 is arranged at space between the first recess region 401 and the second recess region 402. As shown in FIG. 13, three adhesive tapes 30 are attached to space between the first recess region 401 and the second recess region 402 on the first edge frame 201 in FIG. 13. In this way, even if the corresponding hanging lugs 50 are arranged in all the recess regions on the first edge frame 201, the adhesive tape 30 is only arranged between the recess regions on the two ends, such that a sufficient corner expansion amount is reserved. Further, a wrinkle defect caused by inward expansion of the film sheet is avoided, and display quality is ensured.

In embodiments of the present disclosure, as shown in FIG. 13, at least part of the adhesive tape 30 is attached to the first recess region 401, and at least part of the adhesive tape 30 is attached to the second recess region 402. That is to say, the adhesive tape 30 has to be attached to the recess regions located at two ends of any edge frame. In this way, after the first optical element 10 is attached to the fixing frame 20 by means of the adhesive tapes 30, a corner of the diffusion plate is prevented from warping, stability of the backlight module is further ensured, and use performance of the backlight module is improved.

Figure 14:
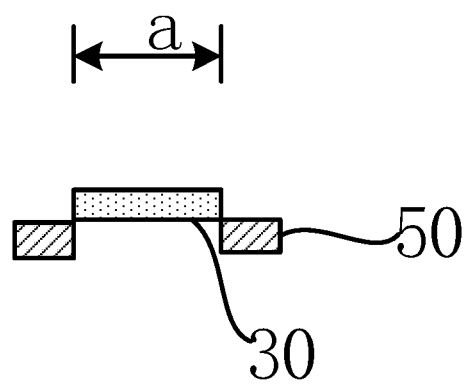
FIG. 14 is a schematic diagram of relative positional relations between an adhesive tape and hanging lugs arranged in recess regions in a backlight module according to an embodiment of the present disclosure.
Figure 15:
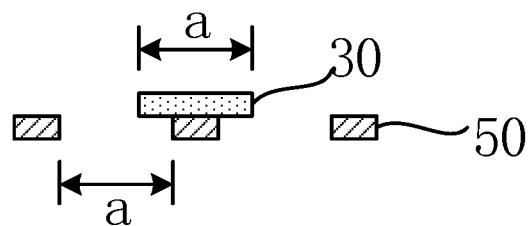
FIG. 15 is a schematic diagram of relative positional relations between an adhesive tape and hanging lugs arranged in recess regions in a backlight module according to an embodiment of the present disclosure.
Figure 16:
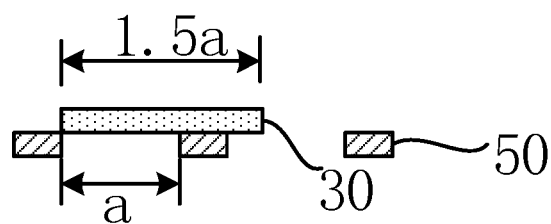
FIG. 16 is a schematic diagram of relative positional relations between an adhesive tape and hanging lugs arranged in recess regions in a backlight module according to an embodiment of the present disclosure.
Figure 17:
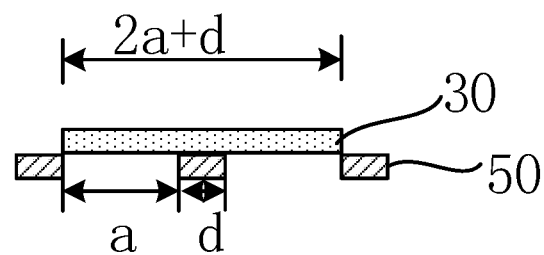
FIG. 17 is a schematic diagram of relative positional relations between an adhesive tape and hanging lugs arranged in recess regions in a backlight module according to an embodiment of the present disclosure.
Figure 18:
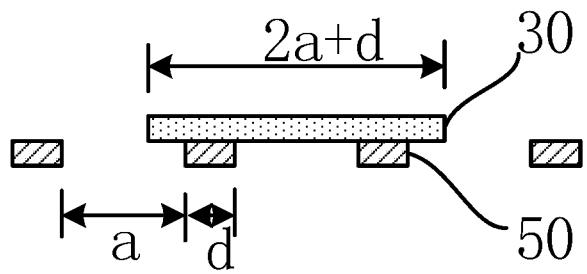
FIG. 18 is a schematic diagram of relative positional relations between an adhesive tape and hanging lugs arranged in recess regions in a backlight module according to an embodiment of the present disclosure.

In embodiments of the present disclosure, on any edge frame, a length of any adhesive tape 30 is within a range of [a, 2a+d]. 'a' represents a distance between any two adjacent recess regions 40, and 'd' represents an extension length of the recess region 40 along the edge frame. In some implementation processes, on any edge frame, the length of any adhesive tape 30 is greater than or equal to 'a' and less than or equal to (2a+d), and the lengths of the adhesive tapes 30 on the same edge may be the same or different. The lengths may be set according to practical application requirements. 'a' represents a distance between any two adjacent recess regions 40. When the hanging lugs 50 are arranged in the recess regions 40, 'a' may represent a distance between two adjacent hanging lugs 50. For example, under the condition that the length of the adhesive tape 30 is 'a', a relative positional relation between the adhesive tape 30 and the hanging lugs 50 arranged in the recess regions 40 may be as shown in FIG. 14 or FIG. 15. For another example, under the condition that the length of the adhesive tape 30 is 1.5a, a relative positional relation between the adhesive tape 30 and the hanging lugs 50 arranged in the recess regions 40 may be as shown in FIG. 16. For another example, under the condition that the length of the adhesive tape 30 is (2a+d), a relative positional relation between the adhesive tape 30 and the hanging lugs 50 arranged in the recess regions 40 may be as shown in FIG. 17 or FIG. 18. In addition, those skilled in the art can set the length of the adhesive tape 30 according to an extension length of a single edge of the fixing frame 20, a length of the single hanging lug 50 and an actual distance between two adjacent recess regions, which will not be described in detail herein.

In addition, in some implementation processes, the extension length of the recess region 40 along the edge frame is generally less than the distance between any two adjacent recess regions 40. In a process of arranging the adhesive tape 30, the distance between any two adjacent recess regions 40 may be directly taken as reference for setting, and the extension length of the recess region 40 along the edge frame is ignored. For example, the length of the adhesive tape 30 is directly set as 'a', or the length of the adhesive tape 30 is set as '2a', so as to improve an attachment speed of the adhesive tape 30, and improve manufacturing efficiency of the backlight module.

In embodiments of the present disclosure, on any edge frame, a distance between any two adjacent adhesive tapes 30 is within a range of [a+2d, 2a+3d], 'a' represents a distance between any two adjacent recess regions 40, and 'd' represents an extension length of the recess region 40 along the edge frame. In some implementation processes, on any edge frame, the distance between any two adjacent adhesive tapes 30 attached thereto is greater than or equal to (a+2d) and less than or equal to (2a+3d). The distance between any two adjacent adhesive tapes 30 on the same edge may be the same or different. The distances may be set according to practical application requirements. For example, a distance between two adjacent adhesive tapes 30 on each edge frame is (a+2d), the lengths of the adhesive tapes 30 on the first edge frame 201 and the second edge frame 202 are (2a+d), and the lengths of the adhesive tapes 30 on the third edge frame 203 and the fourth edge frame 204 are 1.5a. In some implementation processes, the distance between any two adjacent adhesive tapes 30 on the same edge of the fixing frame 20 may be set as (a+2d) or (2a+3d). After the diffusion plate 101 is attached to the fixing frame 20 by means of the adhesive tapes 30, stability between the diffusion plate 101 and the fixing frame 20 is ensured. Moreover, a reserved expansion amount of the diffusion plate 101 is considered, thereby ensuring use performance of the backlight module. In addition, those skilled in the art can set the length of the corresponding adhesive tape 30 on each edge frame and the distance between the adhesive tapes 30 according to practical application requirements, which will not be described in detail herein.

Figure 19:
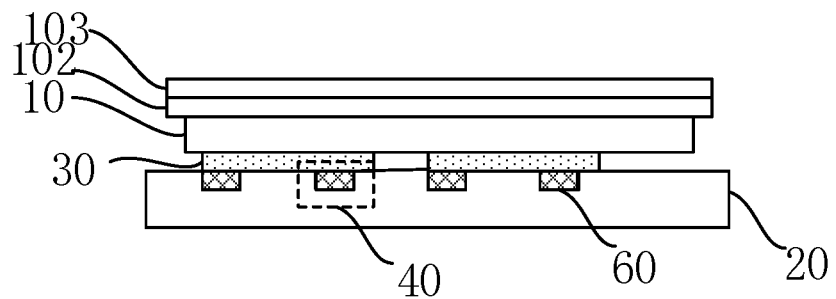
FIG. 19 is a schematic structural diagram of another section in direction OO in FIG. 6.
Figure 20:
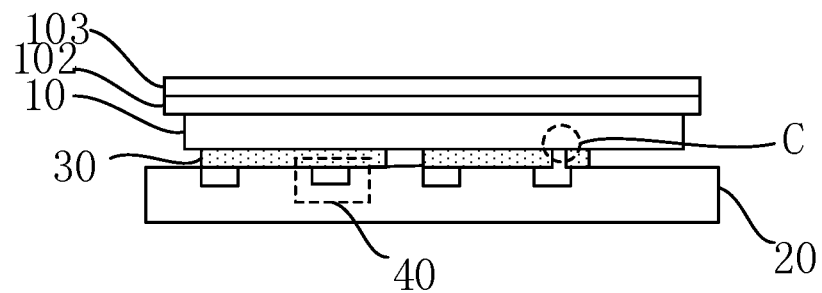
FIG. 20 is a schematic structural diagram in a case in which an adhesive tape in FIG. 19 is broken.

In embodiments of the present disclosure, a schematic structural diagram of another section in direction OO in FIG. 6 is shown in FIG. 19. For example, on the fixing frame 20, the recess region 40 that corresponds to the adhesive tape 30 and is not provided with the hanging lug 50 is filled with rubber 60. A thickness of the rubber 60 is equal to a depth of the recess region 40. In some implementation processes, the recess region(s) 40 on at least one of the third edge frame 203 or the fourth edge frame 204 is not provided with the hanging lug 50. In this case, when the adhesive tape 30 is attached to a position corresponding to the recess region 40 not provided with the hanging lug 50, especially when the first optical element 10 is aligned with the fixing frame 20, since the first optical element 10 may be torn, the adhesive tape 30 may be broken at a corresponding suspended position on the fixing frame 20. The breakage situation of the adhesive tape 30 may be as shown in FIG. 20, and the breakage position is as shown by dashed line box C in FIG. 20. Accordingly, fixing performance of the adhesive tape 30 to the first optical element 10 is affected, and further stability of the backlight module is reduced.

In some implementation processes, on the fixing frame 20, the recess region 40 that corresponds to a position for the adhesive tape 30 to be attached to and is not provided with the hanging lug 50 may be filled with rubber 60 in advance, and a thickness of the rubber 60 is equal to a depth of the corresponding recess region 40. In this case, since a surface of the rubber 60 for filling is generally a relatively smooth surface, the rubber 60 is well bonded with the adhesive tape 30 attached thereto. Therefore, the situation that the adhesive tape 30 is broken by tearing the first optical element 10 is avoided, integrity of the adhesive tape 30 is ensured, and use performance of the backlight module is ensured.

Figure 21:
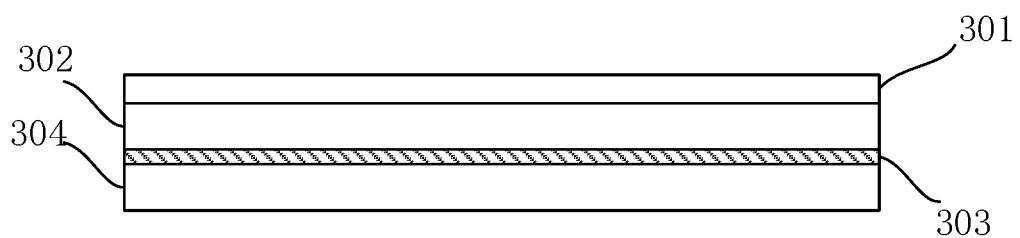
FIG. 21 is a schematic structural diagram of an adhesive tape in a backlight module according to an embodiment of the present disclosure.

In embodiments of the present disclosure, in order to improve stability of the backlight module, the adhesive tape 30 may be a double-sided adhesive tape of non-woven acrylic glue series. A schematic structural diagram of the adhesive tape 30 is as shown in FIG. 21. For example, the adhesive tape 30 includes a release film 301, a first layer of acrylic adhesive 302, a non-woven fabric 303 and a second layer of acrylic adhesive 304 that are sequentially stacked. In a use process, the release film 301 is torn off, the adhesive tape is directly attached to the fixing frame 20, and the whole attachment process is more convenient and rapid. In addition, since the double-sided adhesive tape is low in cost and desirable in viscosity, stability of the backlight module can be effectively ensured, and use performance of the backlight module is ensured.

On the basis of the same inventive concept, embodiments of the present disclosure further provide a display device. The display device may be a liquid crystal display device, and the principle of solving problems of the display device is similar to that of the above backlight module. Therefore, for implementation of the display device, reference may be made to implementation of the above backlight module, and repetitions will not be described.

In some implementation processes, the display device provided in embodiments of the present disclosure may be a mobile phone, a tablet computer, a television, a monitor, a notebook computer, a digital photo frame, a navigator or other products or components with display functions. Other essential components of the display device would be understood by those of ordinary skill in the art and will not be repeated herein, and should not be regarded as a limitation to the present disclosure.

Figure 22:
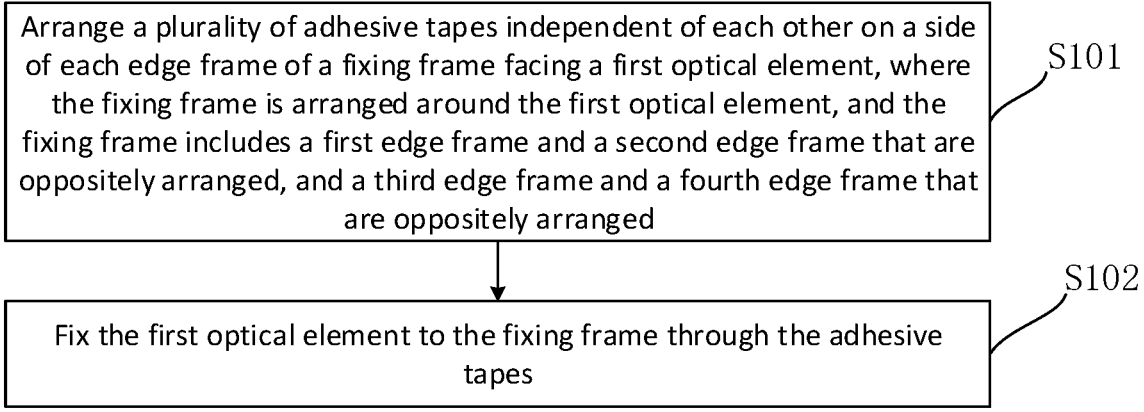
FIG. 22 is a flow diagram of a manufacturing method for a backlight module according to an embodiment of the present disclosure.

On the basis of the same inventive concept, a flow diagram of a manufacturing method for a backlight module according to embodiments of the present disclosure is shown in FIG. 22. The manufacturing method includes:

S101: arrange a plurality of adhesive tapes independent of each other on a side of each edge frame of a fixing frame facing a first optical element, where the fixing frame is arranged around the first optical element, and the fixing frame includes a first edge frame and a second edge frame that are oppositely arranged, and a third edge frame and a fourth edge frame that are oppositely arranged; and S102: fix the first optical element to the fixing frame by means of the adhesive tapes.

In some implementation processes, implementation processes of step S101 and step S2102 are as follows.

Firstly, a plurality of adhesive tapes 30 independent of each other are arranged on a side of each edge frame of the fixing frame facing a first optical element 10. The fixing frame 20 is arranged around the first optical element 10. The fixing frame 20 includes a first edge frame 201 and a second edge frame 202 that are oppositely arranged, and a third edge frame 203 and a fourth edge frame 204 that are oppositely arranged. Then, the first optical element 10 is fixed to the fixing frame 20 by means of the adhesive tapes 30. For example, the first optical element is placed above the adhesive tapes 30, such that by means of the adhesive tapes 30, stability of the backlight module is ensured. In a subsequent high-temperature and high-humidity performance test of the backlight module, since the adhesive tapes 30 are independent of each other, an adhesive force between the adhesive tape 30 and the fixing frame 20 is reduced. Moreover, the performance of the adhesive tape 30 that recoverable deformation occurs corresponding to expansion and contraction of an optical element is improved, such that when the first optical element 10 expands, by mean of relatively small resistance of recoverable deformation of the adhesive tape 30, a wrinkle defect of the corresponding film sheet in the first optical element 10 can be avoided, and display quality is improved.

In embodiments of the present disclosure, under the condition that the backlight module includes a second optical element 102 and a third optical element 103 that sequentially face away from the first optical element 10, after step S102 of fixing the first optical element to the fixing frame by means of the adhesive tapes, the method further includes:

fix the second optical element and the third optical element to the fixing frame with a plurality of hanging lugs arranged on the fixing frame passing through a plurality of hanging lug holes provided on the second optical element and the third optical element.

In some implementation processes, after the first optical element 10 is fixed to the fixing frame 20 by means of the adhesive tapes 30, stability between the first optical element 10 and the fixing frame 20 is ensured. Then, with the plurality of hanging lugs 50 arranged on the fixing frame 20 passing through the plurality of hanging lug holes 500 provided on the second optical element 102 and the third optical element 103, the second optical element 102 and the third optical element 103 are fixed to the fixing frame 20. Therefore, stability between the second optical element 102 and the third optical element 103 and the fixing frame 20 is ensured, and use performance of the backlight module is improved.

Figure 23:
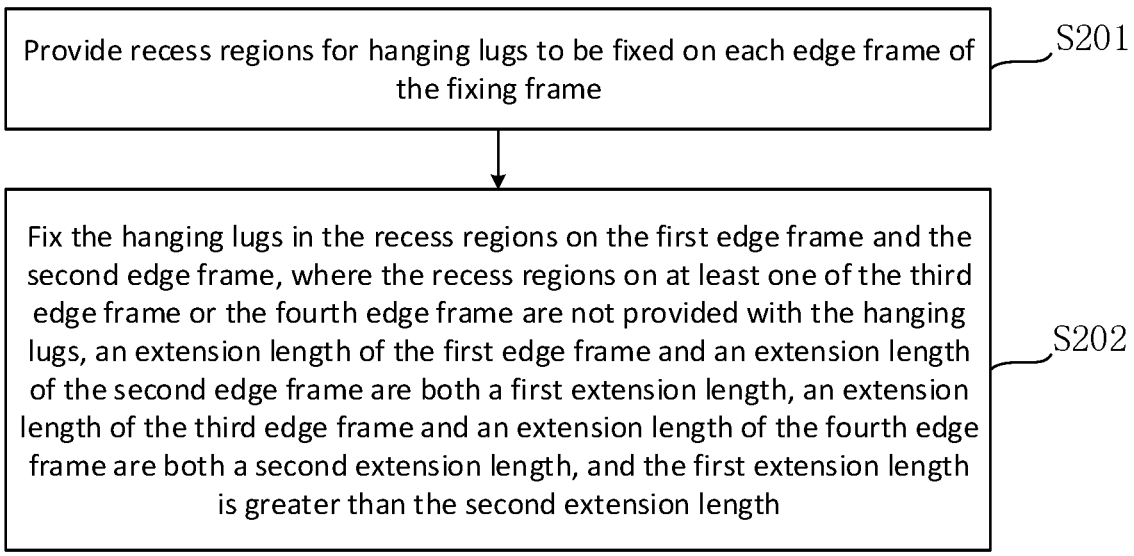
FIG. 23 is a flow diagram of a manufacturing method for a backlight module before step S101 according to an embodiment of the present disclosure.

In embodiments of the present disclosure, as shown in FIG. 23, before step S101 of arranging a plurality of adhesive tapes independent of each other on a side of each edge frame of a fixing frame facing a first optical element, the method further includes:
  S201: provide recess regions for the hanging lugs to be fixed on each edge frame of the fixing frame; and
  S202: fix the hanging lugs in the recess regions on the first edge frame and the second edge frame, where the recess regions on at least one of the third edge frame or the fourth edge frame are not provided with the hanging lug, an extension length of the first edge frame and an extension length of the second edge frame are both a first extension length, an extension length of the third edge frame and an extension length of the fourth edge frame are both a second extension length, and the first extension length is greater than the second extension length.

In some implementation processes, implementation processes of step S201 and step S202 are as follows.

Before a plurality of adhesive tapes 30 independent of each other are arranged on a side of each edge frame of the fixing frame 20 facing the first optical element 10, recess regions 40 for the hanging lugs 50 to be fixed are arranged on each edge frame of the fixing frame 20. Then, the hanging lugs 50 are fixed in the recess regions 40 on the first edge frame 201 and the second edge frame 202. The recess region(s) 40 on at least one of the third edge frame 203 or the fourth edge frame 204 is not provided with the hanging lug 50, and only the recess region(s) is reserved on the edge. In this way, by means of the hanging lugs 50 in the corresponding recess regions 40, the second optical element 102 and the third optical element 103 are limited and fixed to the fixing frame 20, thereby ensuring use performance of the backlight module. The extension length of the first edge frame 201 and the extension length of the second edge frame 202 are both a first extension length, the extension length of the third edge frame 203 and the extension length of the fourth edge frame 204 are both a second extension length, and the first extension length is greater than the second extension length. That is to say, only the recess regions 40 on longer edges of the fixing frame 20 may be provided with the hanging lugs but two shorter edges of the fixing frame 20 may be provided with no hanging lugs 50, and only the recess regions 40 are reserved on the two shorter edges. In this case, when the first optical element 10 expands, the prism sheet 102 and the diffusion sheet 103 may expand along the sides not provided with the hanging lugs 50. Compared with a case in which the hanging lugs 50 are arranged on all edges of the fixing frame 20, reserved expansion space is enlarged, a sheet wrinkle defect caused by interference between the hanging lugs 50 and the related film sheet in the first optical element 10 is avoided, and display quality is improved.

In embodiments of the present disclosure, step S101 of arranging a plurality of adhesive tapes independent of each other on a side of each edge frame of a fixing frame facing a first optical element includes:
  arrange at least one adhesive tape in space between a first recess region 401 and a second recess region 402 at two ends of any edge frame, where the adhesive tape is arranged on a side of the fixing frame facing the first optical element.

In embodiments of the present disclosure, step S101 of arranging a plurality of adhesive tapes independent of each other on a side of each edge frame of a fixing frame facing a first optical element 10 includes:
  attach at least part of the adhesive tape to the first recess region, and attach at least part of the adhesive tape to the second recess region.

In some implementation processes, for specific arrangement of the adhesive tapes 30, reference may be made to modes in the above embodiments, which will not be described in detail herein.

In embodiments of the present disclosure, after step S202 of fixing the hanging lugs in the recess regions 40 on the first edge frame and the second edge frame, the method further includes:
  fill the recess regions 40 on the third edge frame 203 or the fourth edge frame 204 not provided with the hanging lugs with rubber 60, where a thickness of the rubber 60 is equal to a depth of the recess region.

In some implementation processes, after the hanging lugs 50 are fixed on the recess regions 40 on the first edge frame 201 and the second edge frame 202, the recess region(s) 40 on the third edge frame 203 and/or the fourth edge frame 204 not provided with the hanging lug(s) 50 may be directly filled with the rubber 60, and a thickness of the rubber 60 is equal to a depth of the recess region 40. In this way, after the adhesive tape 30 is attached to the fixing frame 20 subsequently, through positioning between the diffusion plate 101 and the fixing frame 20, the adhesive tape 30 may be prevented from being broken due to suspension between the adhesive tape 30 and the recess region 40, thereby ensuring stability between the diffusion plate 101 and the fixing frame 20, and ensuring use performance of the backlight module.

In addition, in some implementation processes, for arrangement of the recess region 40 and arrangement of the adhesive tape 30, reference may be made to the methods in the above embodiments, which will not be described in detail herein.

Embodiments of the present disclosure provide a backlight module and a manufacturing method therefor, and a display device. The backlight module includes a first optical element 10, and a fixing frame 20 arranged around the first optical element 10. The fixing frame 20 includes a first edge frame 201 and a second edge frame 202 that are oppositely arranged, and a third edge frame 203 and a fourth edge frame 204 that are oppositely arranged. A side of each edge frame of the fixing frame 20 facing the first optical element 10 is provided with a plurality of adhesive tapes 30 that are independent of each other and extend in an extension direction of this edge. The first optical element 10 is fixed to the fixing frame 20 by means of the adhesive tapes 30. A side of each edge frame of the fixing frame 20 facing the first optical element 10 is provided with a plurality of adhesive tapes 30 that are independent of each other and extend in an extension direction of this edge. In this case, the first optical element 10 may be fixed to the fixing frame 20 by means of the adhesive tapes 30 independent of each other, thereby ensuring stability of the backlight module. In addition, since the adhesive tapes 30 are independent of each other, an adhesive force between the adhesive tape 30 and the fixing frame 20 is reduced. Moreover, the performance of the adhesive tape that recoverable deformation occurs corresponding to expansion and contraction of an optical element is improved, such that when the first optical element 10 expands, by mean of relatively small resistance of recoverable deformation of the adhesive tape 30, a wrinkle defect of a corresponding film sheet in the first optical element 10 can be avoided, and display quality is improved.

Although preferred embodiments of the present disclosure have been described, those skilled in the art can make additional changes and modifications to these embodiments once they learn the basic inventive concept. Therefore, the appended claims are intended to be interpreted as including preferred embodiments and all changes and modifications falling within the scope of the present disclosure.

Apparently, those skilled in the art can make various modifications and variations to the present disclosure without departing from the spirit and scope of the present disclosure. In this way, in the case that these modifications and variations of the present disclosure fall within the scope of the claims of the present disclosure and their equivalent technologies, the present disclosure is further intended to include these modifications and variations.

What is claimed is:

1. A backlight module, comprising:
   a first optical element;
   a second optical element and a third optical element that sequentially face away from the first optical element; and
   a fixing frame arranged around the first optical element;
   wherein the second optical element and the third optical element are both provided with a plurality of hanging lug holes; and the first optical element is not provided with a hanging lug hole;
   the fixing frame comprises:
      a first edge frame and a second edge frame that are oppositely arranged, and
      a third edge frame and a fourth edge frame that are oppositely arranged,
      wherein a side of each edge frame of the fixing frame facing the first optical element is provided with a plurality of adhesive tapes that are independent of each other and extend in an extension direction of the each edge frame, the first optical element is fixed to the fixing frame through the adhesive tapes, and the fixing frame is made of metal;
   wherein with a plurality of hanging lugs arranged on the fixing frame passing through the corresponding hanging lug holes, the second optical element and the third optical element are fixed to the fixing frame;
   recess regions for the hanging lugs to be fixed are reserved on each edge frame; on any edge frame, there are at least a first recess region and a second recess region that are arranged at two ends of the edge frame respectively; at least one adhesive tape is arranged in space between the first recess region and the second recess region; and at least part of the adhesive tape is attached to the first recess region, and at least part of the adhesive tape is attached to the second recess region.

2. The backlight module according to claim 1, wherein:
   an extension length of the first edge frame and an extension length of the second edge frame are both a first extension length;
   an extension length of the third edge frame and an extension length of the fourth edge frame are both a second extension length;
   wherein the first extension length is greater than the second extension length;
   the recess regions on the first edge frame and the second edge frame are both provided with the hanging lugs; and
   the recess regions on at least one of the third edge frame or the fourth edge frame are not provided with the hanging lugs.

3. The backlight module according to claim 2, wherein sizes of the hanging lug holes corresponding to any edge frame in a length direction of the edge frame gradually increase in a direction away from a center of the fixing frame.

4. The backlight module according to claim 2, wherein:
   an extension length of any recess region along the edge frame on which the recess region is reserved is a preset length; and
   a distance between any two adjacent recess regions on the edge frame on which the two adjacent recess regions are reserved is within a range of (100 mm, 300 mm).

5. The backlight module according to claim 2, wherein:
   on the first edge frame, a distance between any two adjacent recess regions is a first preset distance; and
   on the second edge frame, a distance between any two adjacent recess regions is a second preset distance different from the first preset distance.

6. The backlight module according to claim 2, wherein:
   on the first edge frame, a distance between two adjacent recess regions away from a center of the fixing frame is greater than a distance between two adjacent recess regions close to the center of the fixing frame; and
   on the second edge frame, a distance between any two adjacent recess regions is a same preset distance.

7. The backlight module according to claim 2, wherein:
   on any edge frame, a length of any adhesive tape is within a range of [a, 2a+d];
   wherein 'a' represents a distance between any two adjacent recess regions, and 'd' represents an extension length of the recess region along the edge frame.

8. The backlight module according to claim 2, wherein:
   on any edge frame, a distance between any two adjacent adhesive tapes is within a range of [a+2d, 2a+3d];
   wherein 'a' represents a distance between any two adjacent recess regions, and 'd' represents an extension length of the recess region along the edge frame.

9. The backlight module according to claim 2, wherein:
   on the fixing frame, the recess region that corresponds to the adhesive tape and is not provided with the hanging lug is filled with rubber;
   wherein a thickness of the rubber is equal to a depth of the recess region.

10. A display device, comprising: the backlight module according to claim 1.

11. A manufacturing method for the backlight module according to claim 1, comprising:
    arranging the fixing frame around the first optical element;
    arranging the plurality of adhesive tapes independent of each other on the side of each edge frame of the fixing frame facing the first optical element; and
    fixing the first optical element to the fixing frame through the adhesive tapes.

12. The manufacturing method according to claim 11, further comprising:

with the plurality of hanging lugs arranged on the fixing frame passing through the plurality of hanging lug holes provided on the second optical element and the third optical element, fixing the second optical element and the third optical element to the fixing frame;

wherein the second optical element and the third optical element sequentially face away from the first optical element.

13. The manufacturing method according to claim 12, further comprising:

providing the recess regions for the hanging lugs to be fixed on each edge frame of the fixing frame; and fixing the hanging lugs in the recess regions on the first edge frame and the second edge frame;

wherein the recess regions on at least one of the third edge frame or the fourth edge frame is not provided with the hanging lugs; an extension length of the first edge frame and an extension length of the second edge frame are both a first extension length, an extension length of the third edge frame and an extension length of the fourth edge frame are both a second extension length, and the first extension length is greater than the second extension length.

14. The manufacturing method according to claim 13, wherein said arranging the plurality of adhesive tapes independent of each other on the side of each edge frame of the fixing frame facing the first optical element comprises:

arranging at least one adhesive tape in space between the first recess region and the second recess region at two ends of any edge frame;

wherein the adhesive tape is arranged on a side of the fixing frame facing the first optical element.

15. The manufacturing method according to claim 14, wherein said arranging the plurality of adhesive tapes independent of each other on the side of each edge frame of the fixing frame facing the first optical element further comprises:

attaching at least part of the adhesive tape to the first recess region, and attaching at least part of the adhesive tape to the second recess region.

16. The manufacturing method according to claim 13, further comprising:

filling the recess regions on the third edge frame and/or the fourth edge frame not provided with the hanging lugs with rubber;

wherein a thickness of the rubber is equal to a depth of the recess region.

* * * * *